United States Patent [19]
Andre et al.

[11] Patent Number: 6,162,359
[45] Date of Patent: Dec. 19, 2000

[54] METHOD FOR RECUPERATING VENT GAS COMING FROM AN OZONIZATION REACTOR

[75] Inventors: Marc Andre, Paris; Pierre Liechti, Regensdorf; Denis Marchand, Marly; Eric Thieblin, Plaisir, all of France

[73] Assignees: Degremont; Ozonia International, both of Rueil Malmaison, France

[21] Appl. No.: 09/355,031

[22] PCT Filed: Jan. 26, 1998

[86] PCT No.: PCT/FR98/00133

§ 371 Date: Sep. 1, 1999

§ 102(e) Date: Sep. 1, 1999

[87] PCT Pub. No.: WO98/32522

PCT Pub. Date: Jul. 30, 1998

[30] Foreign Application Priority Data

Jan. 28, 1997 [FR] France ................................ 97 00903

[51] Int. Cl.$^7$ .............................. C02F 3/00; B01D 42/02
[52] U.S. Cl. ...................... 210/604; 210/627; 210/221.2; 261/DIG. 42; 261/77
[58] Field of Search .................... 210/604, 627, 210/221.2; 261/DIG. 42, 77

[56] References Cited

U.S. PATENT DOCUMENTS

| | | | |
|---|---|---|---|
| 3,660,277 | 5/1972 | McWhirter | 210/6 |
| 4,045,347 | 8/1977 | Armstrong | 210/199 |
| 4,132,637 | 1/1979 | Key | 210/7 |
| 4,202,371 | 5/1980 | Armstrong | 137/604 |
| 4,256,574 | 3/1981 | Bhargava | 210/614 |
| 4,507,253 | 3/1985 | Wiesmann | 261/22 |

OTHER PUBLICATIONS

The Nalco Water Handbook, second ed., McGraw–Hill, 1988.

*Primary Examiner*—Chester T. Barry
*Attorney, Agent, or Firm*—Pollock, Vande Sande & Amernick

[57] ABSTRACT

Process for recovering and reusing effluent gas from an ozonization reactor in a plant for treating effluent, especially sewage, which includes a biological reactor, a clarifier and an ozonization reactor. The effluent gas from the ozonization reactor is brought, as a cocurrent, into contact with a stream of water containing compounds that can be oxidized by the ozone, so that the residual ozone is removed and efficiently consumed. The effluent gas thus stripped of the residual ozone is then, optionally, pressurized using a fluid taken from the plant so as to produce a gas/liquid mixture. The gas liquid mixture is converted into an emulsion of fine bubbles, and the emulsion is introduced into the biological reactor, preferably near the bottom of the latter.

21 Claims, 4 Drawing Sheets

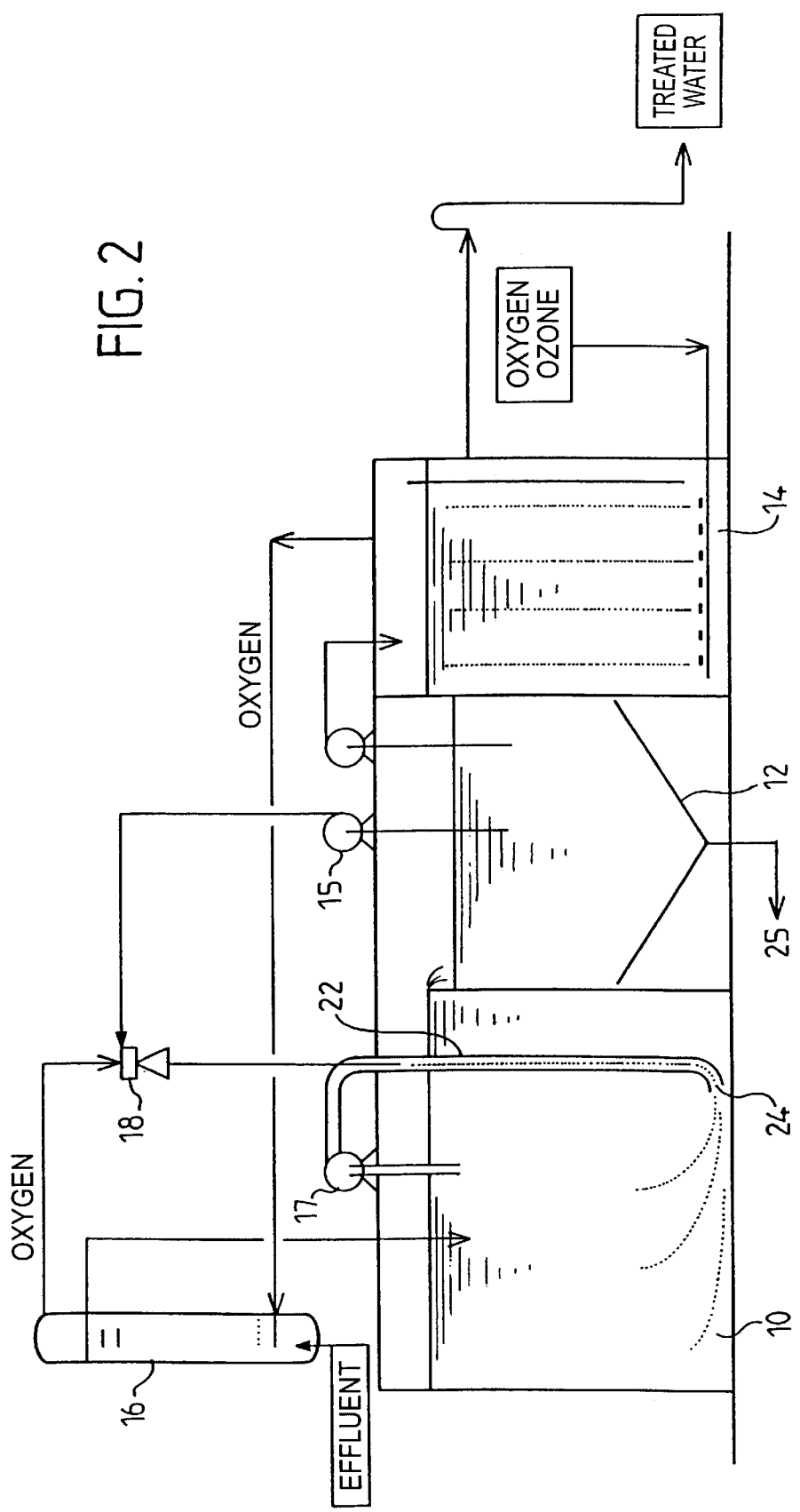

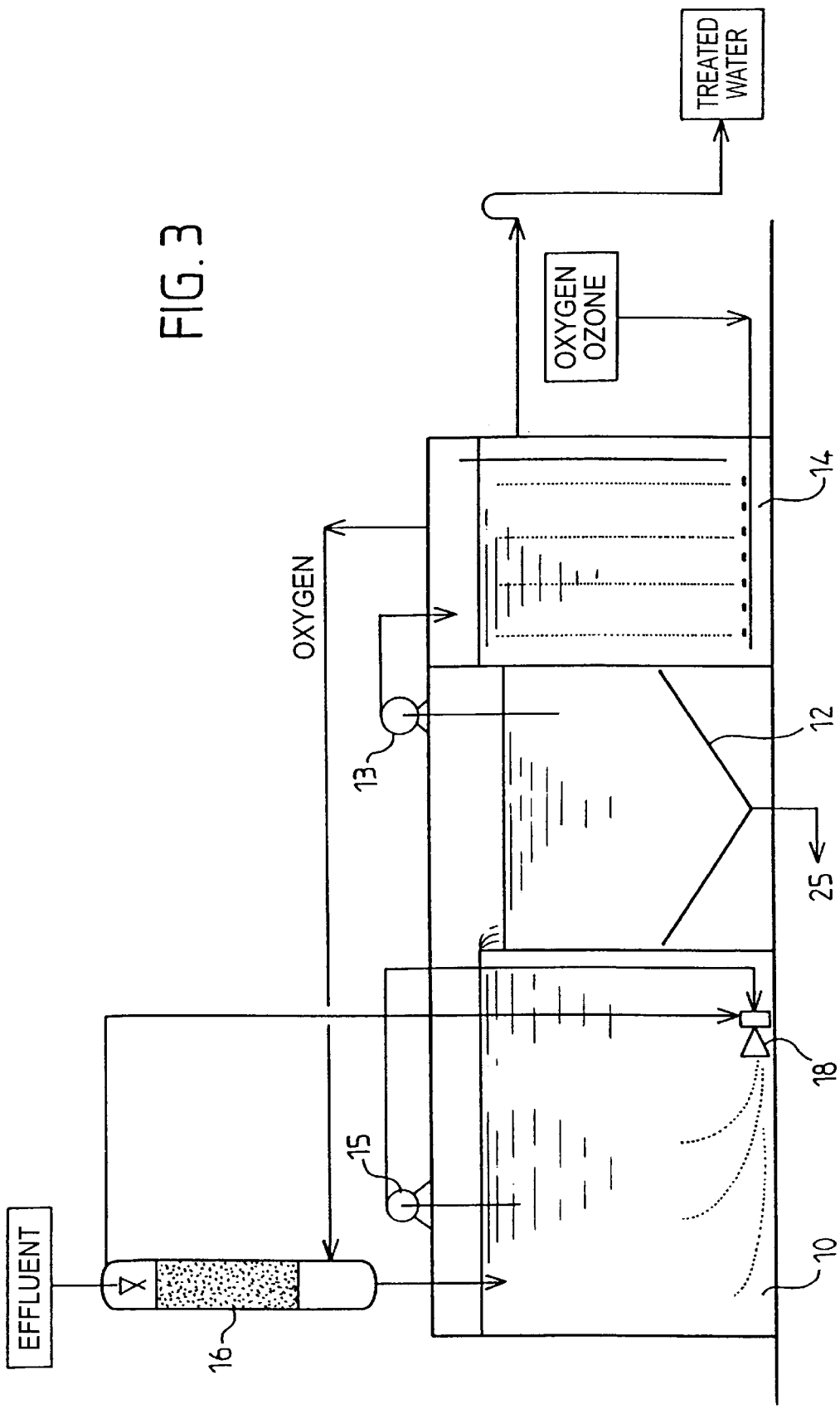

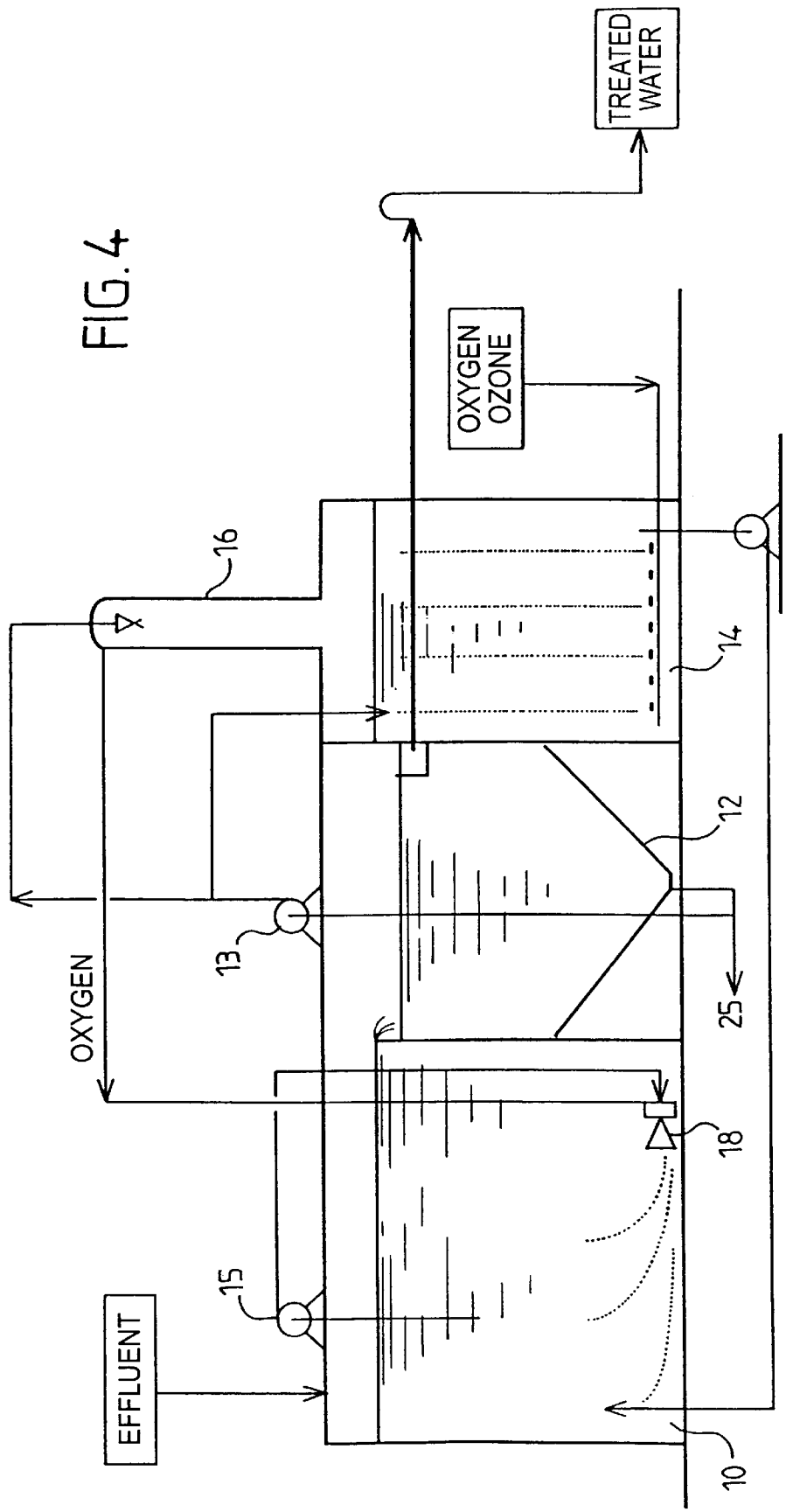

METHOD FOR RECUPERATING VENT GAS COMING FROM AN OZONIZATION REACTOR

FIELD OF INVENTION

The present invention relates to a process and to an apparatus which are designed for recovering and reusing the effluent gas from an ozonization reactor, more particularly in a plant for treating effluent, especially sewage.

BACKGROUND OF THE INVENTION

It is well known in the treatment of effluent, and more particularly of sewage, to carry out an oxidization reaction using ozone, the ozone being dissolved in the effluent to be oxidized or in some of the sludge from the biological reactor or coming from the clarifier, using an ozonization reactor often called an ozonization contactor. Sewage treatment plants are also known which comprise at least one biological reactor, at least one clarifier and at least one ozonization reactor, in this order or in another. The present invention applies more particularly to this type of plant. It should be recalled that if the ozonization reactor treats water coming from the clarifier, it is sometimes necessary to include an additional treatment step of filtration (over sand) between the said clarifier and the said ozonization reactor, this being done so as to remove the suspended matter from the effluent and thus improve the effectiveness of the ozonization treatment.

After being brought into contact in the ozonization reactor with the effluent to be treated or with some of the sludge from the biological reactor or coming from the clarifier, the effluent gas which escapes from the reactor contains a certain amount of residual ozone. It is necessary to avoid discharging an effluent gas having too high an ozone content into the atmosphere.

To avoid such a discharge, it has been envisaged to recover the residual ozone for the purpose of recycling it at the head of the contactor. Thus, WO-95/05340 describes a water purification process using ozone, in which the undissolved residual ozone is collected in order to be reused in the water treatment. Likewise, EP-A-0,047,925 describes a process and an apparatus for the treatment of water using ozone, in which the effluent gas, which contains undissolved oxygen and residual nitrogen, is recovered and recycled into the ozonization reactor. Furthermore, Patent FR-A-2,490,208 describes a process in which the ozonized gas coming from an ozonization reactor is injected directly into the biological treatment tank, without a prior step of stripping the residual ozone and without the implementing apparatuses being described. Finally, Patent Application FR 97/09882 describes a process and an apparatus for the purification of sewage, comprising an additional treatment of the sludge by ozonization. The gaseous effluent from the ozonization reactors is collected so as to reuse it for treating the sewage or any other liquid resulting from the treatment of this sewage. Claims 12 to 14 of this prior application rely on prior destruction of the ozone before its reuse or reutilization. However, such recycling requires a considerable consumption of energy, given that the effluent gas containing the residual ozone has to be pressurized before it is recycled.

Under these conditions, an operation of systematically destroying the residual ozone is more generally carried out. In this regard, reference may be made to the publication "Mémento Technique de l'Eau [*Water Technical Memorandum*]", 50$^{th}$ anniversary issue 1989, second edition, published by Degremont, pages 907–909. Of course, this destruction has the drawback of removing, without being used, a not insignificant amount of ozone, which increases the costs.

BRIEF SUMMARY OF THE INVENTION

The object of the present invention is to provide a process and an apparatus for recovering and reusing the effluent gas which do not have the drawbacks of the prior solutions mentioned above. The objective of the invention is, on the one hand, to recover the residual ozone in order to use it effectively in the ozonization reactor and, on the other hand, to use the oxygen contained in the effluent gas, thus stripped of the residual ozone, for the biological treatment of the effluent.

Consequently, the subject of the present invention is firstly a process for recovering and reusing effluent gas from an ozonization reactor in a plant for treating effluent, especially sewage, which comprises, at the very least, in this order or in another, a biological reactor, a clarifier or any other water/sludge separation device and an ozonization reactor, characterized in that:

the effluent gas from the ozonization reactor is brought into contact with a stream of water containing components that can be oxidized by the ozone, so that most of the residual ozone is removed and used;

the effluent gas stripped of most of the residual ozone is then, optionally, pressurized using a fluid taken from the plant; this fluid possibly being sludge coming from the clarifier or from the biological reactor, water from the clarifier or water coming from the sewage treatment plant, so as to produce a gas/liquid mixture;

the said gas/liquid mixture is converted into an emulsion of fine bubbles; and the said emulsion is introduced into the biological reactor, preferably near the bottom of the latter.

According to the present invention, the stream of water brought into contact with the effluent gas from the ozonization reactor may be a fluid from the plant, or any other liquid from the plant which consumes ozone effectively, such as the sludge from the biological reactor or coming from the clarifier. This fluid may be raw water or water taken from the clarifier, or any other liquid produced by the plant. If the water feeding the contactor bringing the effluent gas into contact with the said stream of water is the same as that treated in the ozonization reactor, a portion or all of the said stream of water containing the matter that could be oxidized by the ozone may be brought into contact with the effluent gas in the contactor, the other portion being fed directly into the reactor 14.

Secondly, the present invention relates to means for recovering and reusing the effluent gas from an ozonization reactor in a plant for treating effluent, especially sewage, for the implementation of the process as specified above, which comprises, at the very least, in this order or in another, a biological reactor, a clarifier (or any other water/sludge separation device), an ozonization reactor, this plant being characterized in that it comprises:

a gas and liquid contactor in which the effluent gas from the reactor is brought into contact with a stream of water which may be raw water before biological treatment, or clarified water after biological treatment; an alternative is the use of sludge from the clarifier or coming from the biological reactor or even any other liquid produced by the plant;

optionally, a water ejector for pressurizing the effluent gas from the said contactor and for producing a gas/liquid mixture, the water used in the said ejector for pressurizing the effluent gas preferably being a fluid taken from the plant; this fluid possibly being sludge coming from the clarifier or from the biological reactor; water from the clarifier or water coming from the sewage treatment plant;

means for converting the said gas/liquid mixture into an emulsion of fine bubbles; and means for introducing the said gas/liquid mixture of fine bubbles, preferably near the bottom of the biological reactor.

According to one characteristic of this plant, the means for introducing the emulsion of fine bubbles into the biological reactor consist of a recirculating pump which takes a stream of liquid from the said reactor and of a vertical channel or pipe, in which the outlet of the said static mixer emerges, the lower end of which vertical channel or pipe emerges at the bottom of the said biological reactor, the said untreated stream taken from this reactor flowing into the said vertical channel or pipe so as to drive the emulsion of fine bubbles down to the bottom of the biological reactor.

According to another characteristic of this invention, the water ejector is placed directly in the biological reactor and the emulsion of fine bubbles is created from sludge directly taken from the biological reactor by means of a pump, the same pump and the same driving fluid serving both to form the emulsion and to bring it into contact with the sludge present in the biological tank.

Further characteristics and advantages of the present invention will emerge from the description given below with reference to the appended drawing, in which:

BRIEF DESCRIPTION OF THE DRAWINGS

FIG. 2 is a diagrammatic representation, similar to FIG. 1, of an alternative form of this plant;

FIG. 3 is a diagrammatic representation, similar to FIG. 1, of another alternative form of this plant; and FIG. 4 is a diagrammatic representation, similar to FIG. 1, of another alternative form of this plant.

DETAILED DESCRIPTION OF THE PREFERRED EMBODIMENTS

Figure 1:
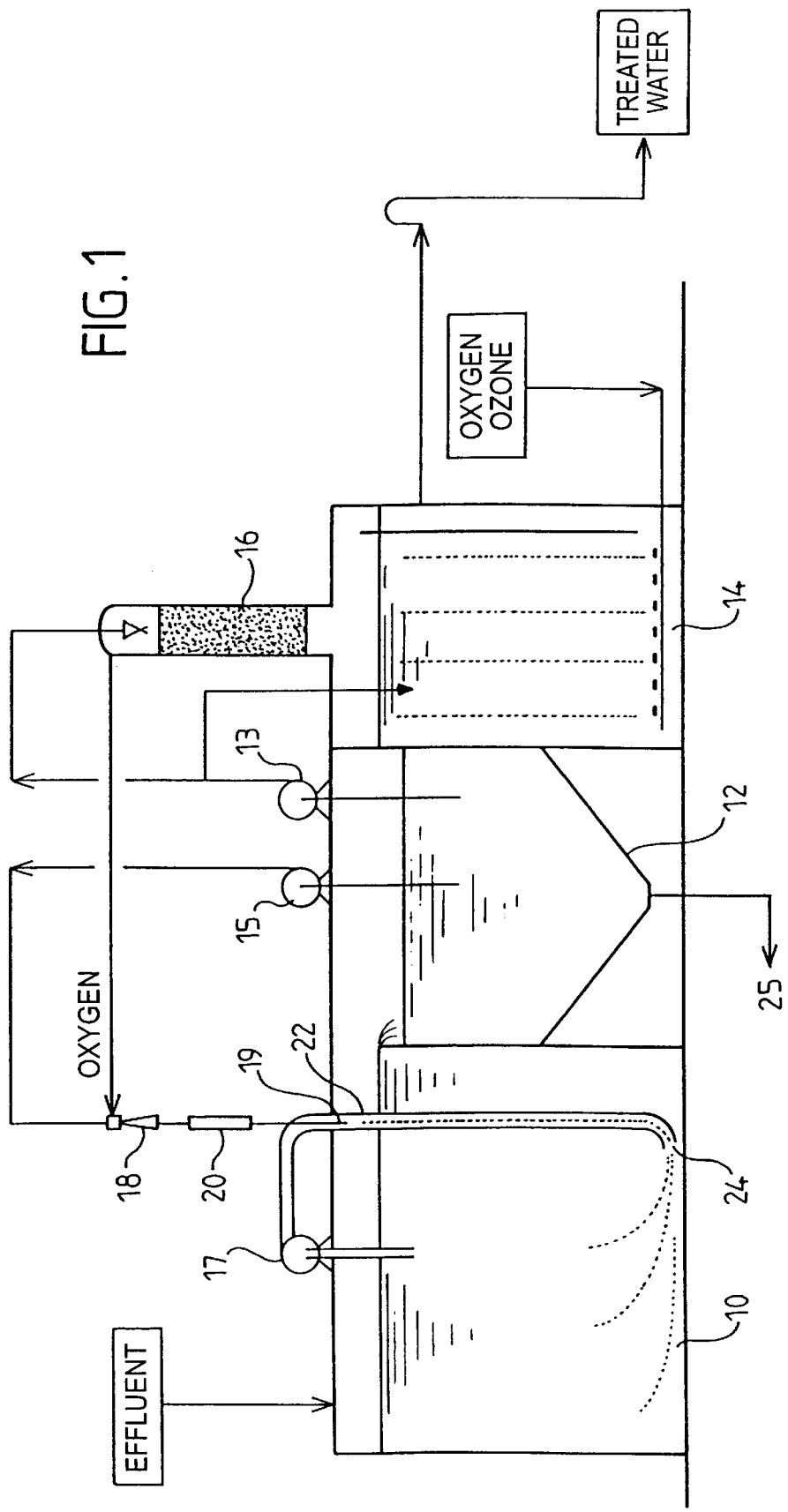
FIG. 1 is a diagrammatic representation of a plant according to the present invention.

FIGS. 1 to 3 show a plant used for ozonizing the water coming from the clarifier.

FIG. 4 shows a plant used for ozonizing the sludge coming from the clarifier.

Referring to the drawings, and more particularly to FIG. 1, it may be seen that the plant to which the present invention applies is a plant for treating effluent, especially sewage, which comprises, in series, a biological reactor 10, a clarifier 12 and an ozonization reactor 14. All these devices are well known and thus it seems pointless to describe them.

According to the present invention, the effluent gas from the ozonization reactor 14, which contains undissolved oxygen and residual ozone, is (in this non-limiting embodiment) brought into contact, as a countercurrent, with water from the biological reactor 10 and from the clarifier 12. For this purpose, a contactor 16 is used which, as may be seen in the figure, preferably consists of a packed column of known type through which some of the clarified water, injected into it by means of a pump 13, trickles as a countercurrent to the effluent gas coming from the ozonization reactor 14. It should be noted that a portion or all of the water to be treated in the ozonization reactor 14 can pass through the contactor 16. The major portion of the residual ozone is thus consumed by the most rapid ozonization reactions. This technique has the double advantage of eliminating most of the residual ozone present in the effluent gas coming from the ozonization reactor 14, which would be harmful for the biological treatment if it were to be reintroduced in large amounts, and of improving the overall efficiency of the use of the ozone for oxidation.

In the alternative form of the invention illustrated in FIG. 2, the effluent gas from the ozonization reactor 14 is brought into contact, as a cocurrent, with a stream of raw water in the contactor 16.

An effluent gas is therefore obtained which is stripped of most of the ozone and essentially contains only oxygen that has not dissolved in the reactor 14. According to the present invention, this oxygen is recovered in order to be recycled into the biological reactor 10. For this purpose, it has to be pressurized, unless the ozonization reactor 14 is under pressure. According to the invention, a water ejector is used for this purpose which produces a gas/liquid mixture under pressure. Shown diagrammatically at 18 in the figure is such a water ejector, which is of a known type and which consequently will not be described in detail. Preferably, the driving water used in the ejector 18 is clarified water taken from the clarifier 12 using a pump 15.

The gas/liquid mixture, thus pressurized, from the water ejector 18 (or directly from the ozonization reactor 14, when the latter is under pressure) is then converted into an emulsion of fine bubbles. A static mixer 20 (FIG. 1) can be used for this purpose. The emulsion thus obtained is then introduced into the biological reactor 10. The apparatus according to the invention uses here, for this purpose, means which consist of a recirculating pump 17, which takes a stream of water from the biological reactor 10, and of a vertical channel or pipe 22 in which the outlet pipe 19 of the static mixer 20 emerges, the lower end 24 of which vertical channel or pipe emerges at the bottom of the biological reactor. By virtue of these means, the emulsion of fine bubbles produced is driven down to the bottom of the biological reactor 10 and distributed within the mass of effluent present in this reactor.

In the alternative form of the invention illustrated in FIG. 3, the ozone-containing gas is brought into contact with the raw water in a cocurrent contactor 16. Moreover, this alternative form of the invention is identical to the embodiment described with reference to FIG. 1. The emulsion may be obtained from the driving water coming from the biological reactor 10. The emulsion thus obtained is then introduced into the biological reactor. For this purpose, the water ejector 18 may be placed directly in the biological reactor. According to an alternative form, the feed pump 15 delivering the driving water to the ejector may possibly be placed in the biological reactor.

In the alternative form of the invention illustrated in FIG. 4, the effluent gas, containing undissolved oxygen and residual ozone, is brought into contact with the sludge 25 coming from the, clarifier 12. As may be seen in the figure, a contactor 16 is used, in which the sludge is introduced by means of a pump 13. It should be noted that a portion or all of the sludge to be treated in the ozonization reactor 14 may pass through the contactor 16. The other devices for reusing the gas are not described since they are identical to those in FIG. 3.

It will have been understood from reading the description above that the invention makes it possible to remove from the effluent gas most of the residual ozone, while avoiding having to discharge this ozone into the atmosphere or to remove it, which ozone is used efficiently for the oxidation reactions, in order to recycle the undissolved oxygen contained in the effluent gas and to carry out aerobic treatments in the biological reactor. It will have been noted that the apparatus forming the subject of the invention does not require a compressor for recycling the effluent gas, the latter being pressurized, if necessary, by a water ejector, which is inexpensive and simple to manufacture, and only requiring a low consumption of energy because of operation at low pressure. Moreover, the production and use of fine bubbles make it possible to reduce the hydrostatic loads and to obtain a very high surface area for gas/liquid transfer throughout the mass of effluent contained in the biological reactor, while at the same time producing vigorous stirring within this mass, favouring the distribution of the oxygen bubbles.

Moreover, depending on the methods of implementation of the said invention, various advantages may be expected. This is because the sludge treatment in the ozonization reactor can result in a reduction in the mass of sludge produced by the water treatment process, and the treatment of the water coming from the clarifier by the ozone and the recycling of this water into the biological reactor allows a reduction in the physico-chemical parameters of the treated water coming from the water treatment plant.

Of course, it remains the case that this invention is not limited to the embodiments or methods of implementation described and shown here, rather it encompasses all alternative forms thereof provided that they fall within the scope of the appended claims.

What is claimed is:

1. Process for recovering and reusing effluent gas from an ozonization reactor in an effluent treating plant which includes a biological reactor, a water/sludge clarifier and an ozonization reactor, the steps comprising:

bringing the effluent gas from the ozonization reactor into contact with a stream of water containing compounds that can be oxidized by residual ozone in the effluent gas so that the residual ozone is removed and efficiently consumed;

mixing the effluent gas thus stripped of the residual ozone with a fluid taken from the plant so as to produce a gas/liquid mixture;

converting said gas/liquid mixture into an emulsion of fine bubbles; and introducing said emulsion into a bottom portion of the biological reactor.

2. Process according to claim 1, wherein said fluid taken from the plant and mixed with the stripped effluent gas is pressurized.

3. Process according to claim 1, wherein the stream of water brought into contact with the effluent gas from the ozonization reactor is effluent.

4. Process according to claim 1, wherein the stream of water brought into contact with the effluent gas from the ozonization reactor is sludge from the biological reactor.

5. Process according to claim 1, wherein the stream of water brought into contact with the effluent gas from the ozonization reactor is sludge from the clarifier.

6. Process according to claim 1, wherein the fluid brought into contact with the effluent gas from the ozonization reactor is treated water or water undergoing treatment.

7. Process according to claim 1, wherein the fluid brought into contact with the effluent gas from the ozonization reactor is at least part of the feed stream for the ozonization reactor.

8. Process according to claim 1, wherein the stream of water brought into contact with the effluent gas from the ozonization reactor is water taken from said clarifier.

9. Process according to claim 1, wherein the fluid which is mixed with the stripped effluent gas is water taken from said clarifier and filtered beforehand.

10. Process according to claim 1, wherein the fluid which is mixed with the stripped effluent gas is sludge from the biological reactor.

11. Process according to claim 1, wherein the fluid which is mixed with the stripped effluent gas is sludge from the clarifier.

12. Process according to claim 1, wherein the fluid which is mixed with the stripped effluent gas is treated water leaving the effluent ozonization reactor.

13. Apparatus for recovering and reusing the effluent gas from an ozonization reactor in a treatment plant for treating effluent which comprises a biological reactor, a clarifier, and an ozonization reactor, this apparatus further comprising:

a contactor in which the effluent gas from the ozonization reactor is brought into contact with a stream of liquid, said liquid being effluent or a liquid produced by the treatment plant;

an ejector for pressurizing the effluent gas from said contactor so as to produce a gas/liquid mixture;

means for converting said gas/liquid mixture into an emulsion of fine bubbles; and means for introducing said gas/liquid mixture near the bottom of the biological reactor.

14. Apparatus according to claim 13, wherein said contactor is a packed column through which water trickles as a countercurrent to the effluent gas.

15. Apparatus according to claim 13 wherein said means for converting is a static mixer which is placed downstream of the ejector.

16. Apparatus according to claim 13 wherein a liquid inlet to the ejector is connected to and in fluid communication with an outlet of said clarifier.

17. Apparatus according to claim 13, wherein a liquid inlet to the ejector is connected to and in fluid communication with an outlet of said biological reactor.

18. Apparatus according to claim 13, wherein a liquid inlet to the ejector is connected to and in fluid communication with an outlet of said ozonization reactor.

19. Apparatus according to claim 13, wherein a liquid inlet to the ejector is connected to and in fluid communication with an outlet of said clarifier.

20. Apparatus according to claim 13, wherein the means for introducing the emulsion of fine bubbles into the biological reactor consist of a recirculating pump which takes water from said biological reactor and of a vertical pipe into which the outlet of said means for converting emerges, the lower end of the pipe emerging near the bottom of said biological reactor, a stream of water taken from the biological reactor flowing into said pipe so as to drive the emulsion of fine bubbles down to the bottom of the biological reactor.

21. Apparatus according to claim 13, wherein the means for introducing the emulsion of fine bubbles into the biological reactor consist of a recirculating pump which is placed inside the biological reactor and which takes water from the biological reactor, and from the ejector placed in the biological reactor.

* * * * *